206-511 S2
2/3/87 X2 RE 32,344

United States Patent [19]

Wind

[11] E Patent Number: Re. 32,344

[45] Reissued Date of Patent: Feb. 3, 1987

[54] SHIPPING PALLET AND A PACKAGE FORMED THEREFROM

[75] Inventor: Joseph H. Wind, Taylors, S.C.

[73] Assignee: Bigelow-Sanford, Inc., Greenville, S.C.

[21] Appl. No.: 656,142

[22] Filed: Sep. 28, 1984

Related U.S. Patent Documents

Reissue of:

[64] Patent No.: 4,413,737
Issued: Nov. 8, 1983
Appl. No.: 295,524
Filed: Aug. 24, 1981

U.S. Applications:

[63] Continuation-in-part of Ser. No. 229,195, Jan. 28, 1981, abandoned.

[51] Int. Cl.[4] ..... B65D 19/00; B65D 19/38; B65D 21/02

[52] U.S. Cl. ..... 206/599; 206/511; 108/53.1; 108/53.3; 217/43 A

[58] Field of Search ..... 206/503, 509, 511, 512, 206/599, 600; 217/43 A; 108/52.1, 53.1, 53.3, 53.5, 57.1

[56] References Cited

U.S. PATENT DOCUMENTS

| | | |
|---|---|---|
| 2,918,190 | 12/1959 | Martin . |
| 2,950,078 | 8/1960 | Phillips . |
| 2,973,931 | 3/1961 | Brown . |
| 3,145,870 | 8/1964 | Lockwood . |
| 3,187,691 | 6/1965 | Leitzel . |
| 3,346,137 | 10/1967 | Ricci . |
| 3,371,816 | 3/1968 | Ricci . |
| 3,524,415 | 8/1970 | Heiman . |
| 3,526,195 | 9/1970 | Maryonovich . |
| 3,664,570 | 5/1972 | Kupersmit . |
| 3,696,761 | 10/1972 | Brown . |
| 3,968,895 | 7/1976 | Barnes . |
| 4,000,704 | 1/1977 | Griffin . |
| 4,042,107 | 8/1977 | Kendig . |
| 4,254,873 | 3/1981 | Cook . |

FOREIGN PATENT DOCUMENTS

| | | |
|---|---|---|
| 2165676 | 7/1973 | Fed. Rep. of Germany . |
| 2909541 | 9/1980 | Fed. Rep. of Germany . |

*Primary Examiner*—George E. Lowrance
*Attorney, Agent, or Firm*—Bell, Seltzer, Park & Gibson

[57] ABSTRACT

A shipping container is provided comprising a pallet as the bottom thereof, an inverted identical pallet as the top thereof, and a peripheral sleeve forming load-bearing side walls mating with each pallet via a peripheral sleeve-receiving groove defined by a peripheral rim. The unitary pallet is configured so that a bottom pallet of one container will mate with the inverted top pallet of a lower container, when containers are stacked, in such a way as to prevent shifting between containers. Said pallets are also self-nesting for transport or storage when unloaded. The containers will stack even if vertically adjacent mutually inverse pallets are rotated 180° in a horizontal plane with respect to each other. This ability to tolerate a 180° rotation is provided by depending members and platform members of the pallet feet, oriented so that (i) a 180° rotation of the pallet in the plane of the pallet results in a depending member/platform member pattern the same as the pattern prior to rotation and (ii) a 180° rotation of the pallet about a center line lying in the plane of the pallet results in a depending member/platform member pattern which engages the unrotated depending member/platform member pattern in mutually abutting relationship. The pallets also have their feet so disposed to permit four-way fork lift entry. An alternative embodiment is provided wherein said pallets are nestable and stackable at 90° intervals of relative rotation.

* * * * *

The questions raised in reexamination request No. 90/000,636, filed Sep. 24, 1984, have been considered and the results thereof are reflected in this reissue patent which constitutes the reexamination certificate required by 35 U.S.C. 307 as provided in 37 CFR 1.570(e).

27 Claims, 15 Drawing Figures

17
23c
23
23b
23a
19
11
24d
16
24a
24
15
19
20a
20
20b
17

23c
23
23b
23a
11
24
24b
29
24d
24a
15
20a
20

23c
23
25d
23a
25b
11
28
28b
24b
28h
28a
24a
24
26e
20a
20
26a
26c 25c
21b
21
21a
19
11
29
28
28b
28c
27e
27b
27
29
19
22b
22a
22
26c

SHIPPING PALLET AND A PACKAGE FORMED THEREFROM

Matter enclosed in heavy brackets [ ] appears in the original patent but forms no part of this reissue specification; matter printed in italics indicates the additions made by reissue.

CROSS REFERENCE TO RELATED APPLICATION

This application is a continuation-in-part of my abandoned United States application Ser. No. 06/229,195, filed Jan. 28, 1981, and entitled SHIPPING PALLET.

BACKGROUND OF THE INVENTION

This invention relates to an improved shipping pallet of unitary construction, and to an improved packaging container comprising one each such pallet as top and bottom thereof in combination with a peripheral sleeve forming load-bearing walls and a plurality of strapping bands, suitable for but not limited to the packagi..g, storage and transport of yarn.

At the present time wooden pallets are widely used to form packaging containers for transporting "cheeses", "bobbins" or "cones" of yarn from a yarn manufacturing or storage facility to a yarn utilization plant, such containers typically also including open wooden sides and an open top, all held together by bailing wire. Such wooden pallets and containers are undesirably heavy but of varying weight, do not completely enclose the yarn to provide desired protection against weather, pilferage, vandalism, soiling and other damage, are susceptible to breakage and other deterioration such as splintering, and have a limited useful life. Further, when such containers are stacked for storage or transport, for example—three or four high, they frequently shift dangerously one with respect to the other, since neither pallet nor container provides adequate means for preventing such relative movement. When such containers are returned empty for re-use, they take up as much space as when loaded, unless they are disassembled. Disassembly is costly, time consuming, and potentially hazardous to employees. Reassembly via bailing wire and so forth is equally time consuming, costly, and potentially hazardous.

In order to overcome these deficiencies of wooden pallets and the containers formed therewith, packaging schemes employing unitary plastic pallets have been devised. In some of these plastic pallet arrangements, exemplified by U.S. Pat. Nos. 3,524,415 to Heiman, 3,526,195 to Maryonovich, and 4,000,704 to Griffin, the package is sandwiched between a top and bottom held together by conventional banding, but without load-bearing side walls, and wherein the yarn "cones" or the like as such bear and transmit the load imposed by stacked containers from one container to the next. Other references of interest are U.S. Pat. Nos. 3,187,691; 3,346,137 and 3,696,761.

The pallet configuration shown in the Heiman patent is self-nesting for unloaded transport or storage as shown in FIG. 2 thereof, self-interlocks with a particularly formed plastic shipping lid as shown in FIG. 1 thereof to prevent shifting while stacked, and accommodates four-way fork lift entry. However, the Heiman pallet has six feet disposed along two opposite edges thereof, with no intermediate support, and therefor has poor load-bearing characteristics. Further, the upper shipping lid cover of the Heiman package necessarily has a different configuration than the supporting pallet at the bottom of the package, and the ridges formed therein for engaging the pallet feet to resist shifting are shallow and subject to disengagement when misaligned or set slightly ajar. As aforesaid, the package formed using such pallet and lid has no load-bearing side wall members, but rather depends on the packaged payload to bear and transmit the weight of stacked containers.

Maryonovich discloses an improvement over the Heiman arrangement, in that a pallet identical to that forming the package bottom may, when inverted, serve to form the package top, with the payload being sandwiched therebetween, and secured by strapping bands. Here again, no provision is made for load-bearing wall members, and the payload itself is relied upon to bear and transmit the weight of stacked containers. Unloaded pallets are nestable for storage or transport in a single orientation only. Adjacent each of the nine pallet feet, which are spaced for four-way fork lift entry, is a socket formed by and within a minimal network of reinforcing ribs. The sockets of an inverted pallet, acting as a top, mate with and receive therewithin the feet of a pallet acting as a bottom of the next higher package in the stack. Such stackability is, however, available in a single orientation only, and indicia would be required for ready location of proper orientation. The nine foot/-socket combinations as such transmit the entire vertical load from pallet to pallet, and each mating pair will tend to jam and distort. Moreover, the socket bottoms will tend to be weak, and the dislocations within the minimal reinforcing rib network represented by the sockets will weaken the entire pallet and promote excess flexure under load.

Griffin discloses an alternative to the Maryonovich arrangement, wherein an identical pallet structure can as well be employed both as the supporting pallet and as the top lid, with the payload sandwiched therebetween and secured by banding straps. There being no provision for load-bearing side wall members, the payload itself is relied upon to bear and transmit the weight of stacked packages. The unloaded pallet is also self-nesting for transport or storage as shown in FIG. 9 thereof, and also self-interlocking with a suitably oriented mutually inverted pallet to facilitate stacking while tending to prevent relative shifting. Griffin employs a pallet structure having nine feet, with each foot having a bottom featuring alternating male and female "undulations" or reinforcing ribs. Such undulations are oriented in a "herringbone" pattern so that (as best shown in FIG. 1 thereof) inversion of the pallet in a certain single orientation generates a similarly directed but phase-shifted "herringbone" pattern which interlocks with that of the upside right pallet and wherein the respective female undulations fit together with counterpart male undulations, and vice versa. The Griffin pallet, however, cannot in its principal embodiment accommodate four-way fork lift entry, and in its alternative embodiment would be unable to accommodate such large loads as is asserted therein. It is likewise both nestable and stackable only in a single orientation, thus necessitating the employment of indicia for proper orientation location. The Griffin pallet is stronger than that of Maryonovich, and is thus an improvement thereover. However, Griffin's "herringbone" undulations are shallow, and tend to disengage under misalignment, thus permitting shifting. Said misalignment would be frequently encountered because of the complexity of the "herringbone" pattern, which complexity requires great precision and skill from the fork lift operator attempting to stack packages. Further, such "undulations" as such form the entire vertical support means, and will have some tendency to jam together or otherwise distort under load.

Accordingly, an object of the present invention is to provide an improved unitary shipping pallet which can accommodate four-way fork lift entry, is self-nesting without the need to refer to orientation indicia on the pallets, and which provides increased strength.

A further object of the present invention is to provide an improved unitary shipping pallet with a plurality of foot means so disposed as to mate with an identical inverted pallet in stacked relationship, without resort to orientation indicia, wherein certain portions of said foot means provide vertical-load-bearing support, when engaged with corresponding portions of the foot means of the inverted pallet, and other portions thereof engage in shift prevention relationship with corresponding foot means of said inverted pallet.

A still further object of the present invention is to provide a nestable, stackable shipping pallet wherein the foot means thereof, when mating with the foot means of an inverted pallet in stacked relationship, are so configured as to prevent or minimize foot distortion under load, and to prevent or minimize foot means to foot means jamming due to pallet flexure when under load.

Another object of the present invention is to provide an improved shipping container wherein one said improved pallet serves as the bottom thereof, and an inverted identical pallet serves as top thereof, and wherein vertical-load-bearing walls on each side thereof are provided in the form of a peripheral sleeve, said sleeve mating with a peripheral groove formed in each said pallet by a peripheral rim thereof, said container being secured by strapping bands.

Yet another object of the present invention is to provide an improved shipping container as aforesaid wherein several such containers may be stacked one on top of the other with ease and without requiring significant precision and skill from a fork lift operator, but wherein there is considerably improved stability within a stack of such containers provided by the aforesaid shift-resisting interengagement of the foot means of the respectively adjacent pairs of inverted top pallets and upside right bottom pallets.

SUMMARY

As herein described there is provided a shipping pallet of the type formed of a single sheet of material and so constructed as to be used with another substantially identical pallet to serve as a bottom or top wall of a shipping container for transporting and storing a load, wherein the shipping pallet has a generally planar base and a plurality of foot means projecting from the base, the foot means including corner foot means positioned in respective corner areas of the pallet, central foot means positioned centrally of the pallet, and intermediate foot means positioned between adjacent corner foot means, and wherein each of the foot means comprises at least one projecting member and a platform member adjacent each projecting member. The projecting members and the platform members are so arranged relative to each other that the pallet when in use in a predetermined position of orientation, and at least another position of orientation 180° out-of-phase therefrom, may be stacked in mating relation to a substantially identical inverted pallet and with the projecting members abutting the platform members of the inverted pallet and serving to provide a lateral anti-shift interengagement between the adjacent pallets in a plurality of directions.

IN THE DRAWINGS

FIG. 14b is a plan view of the exterior surface of the pallet shown in FIG. 14a.

DETAILED DESCRIPTION

Figure 1:
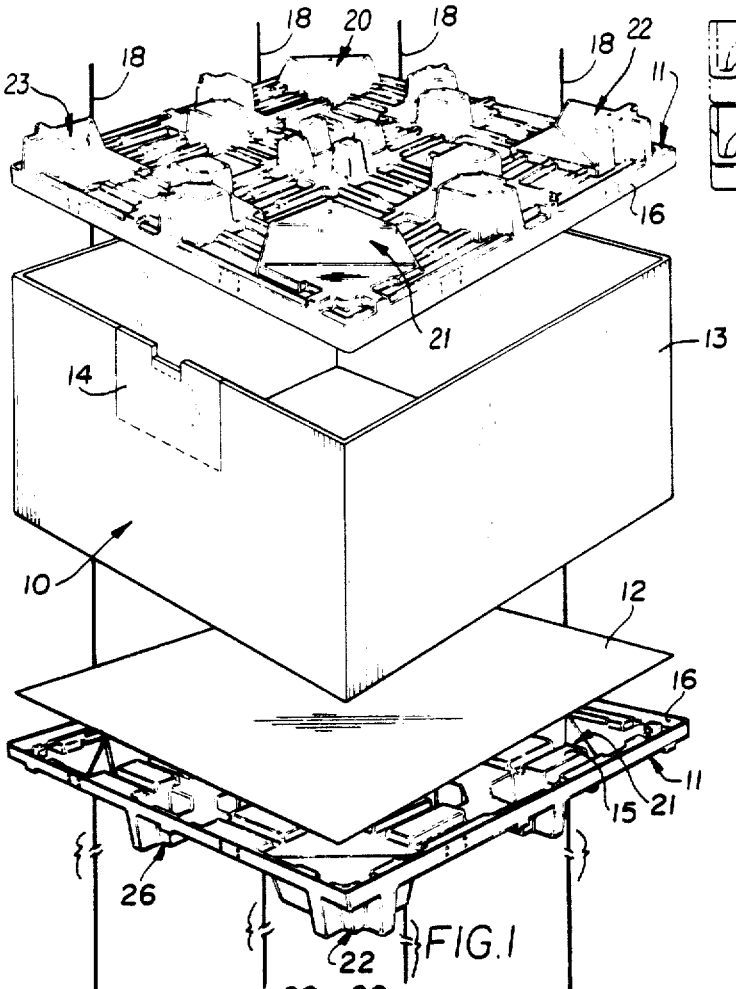
FIG. 1 is an exploded isometric assembly view of a shipping container incorporating identical pallets as top and bottom, and a peripheral sleeve providing load-bearing side walls in accordance with the present invention.

As shown in FIG. 1, a shipping container 10 for yarn or another load to be stored or transported, comprises a bottom pallet 11, a floor panel 12 preferably formed of double-wall corrugated cardboard, a peripheral sleeve 13 forming vertical-load-bearing side walls and preferably formed of triple-wall corrugated cardboard, an access or inspection panel 14 in one side wall of said sleeve, and an inverted top pallet 11 which is substantially identical to the bottom pallet 11. The floor panel 12 and sleeve 13 may be of thicker or thinner material depending on the load to be borne, and the walls of sleeve 13 are preferably articulably hinged together by any suitable means.

Figure 5:
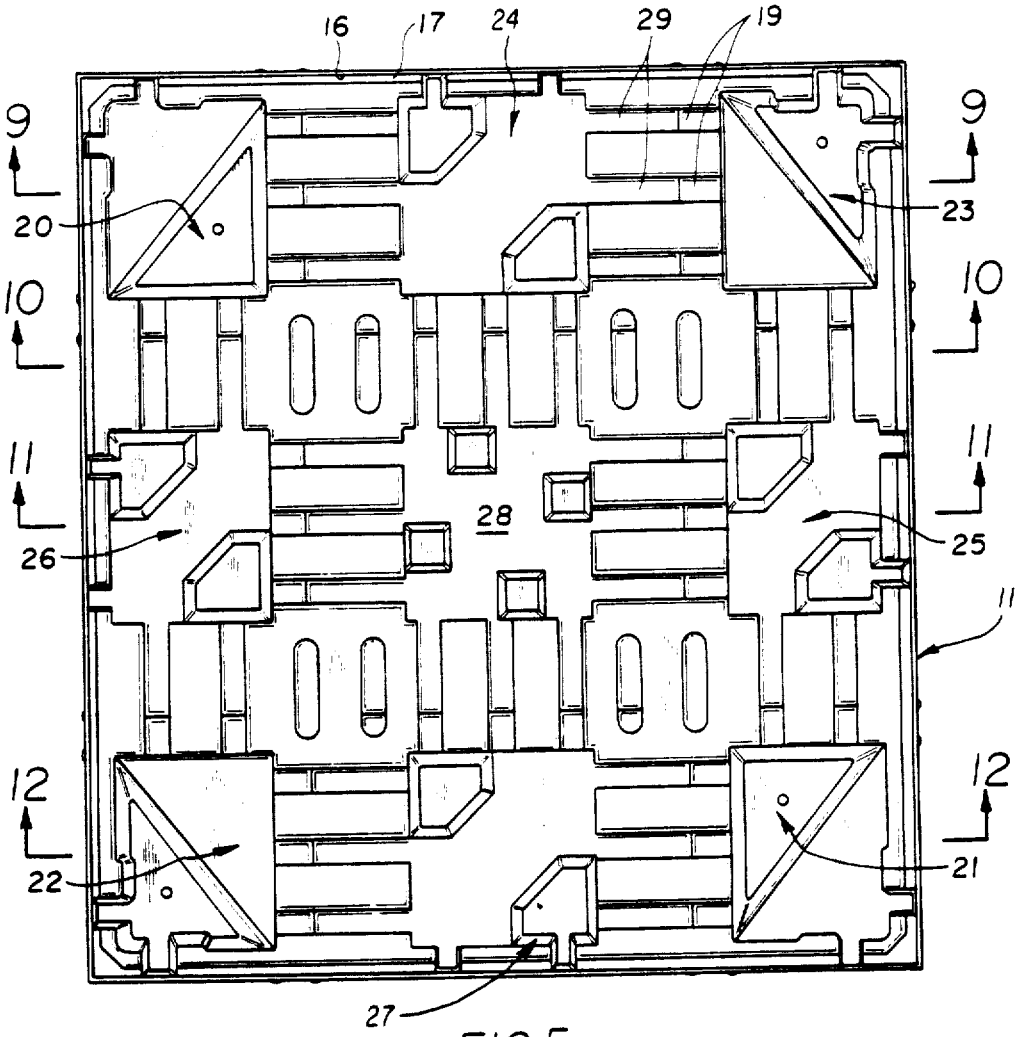
FIG. 5 is a plan view of the interior surface of said pallet.
Figure 6:
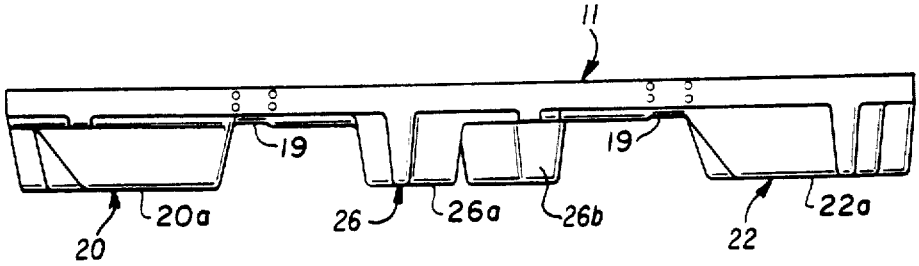
FIG. 6 is a side elevation view of said pallet, the opposite side elevation view being the same.

The pallet 11 is unitary and is formed from a single sheet of formable or deformable material of suitable thickness selected according to the size of the load to be contained, a moldable or vacuum-formable thermoplastic material such as polyethylene being preferred. Such pallet is preferably rectangular, but may also be square, or even octagonal or otherwise shaped depending on the nature of the material to be contained. In order to receive and retain the sleeve 13, the pallet 11 is provided with a generally planar base 15 having an outwardly extending peripheral exterior rim 16, which projects upwardly when the pallet 11 is serving as the bottom of a container, and which projects downwardly when the pallet 11 is serving as the top of a container. A peripheral sleeve-receiving groove 17 (see FIG. 5) is provided between the rim 16 and the portion of the base 15 surrounded thereby.

Figure 4:
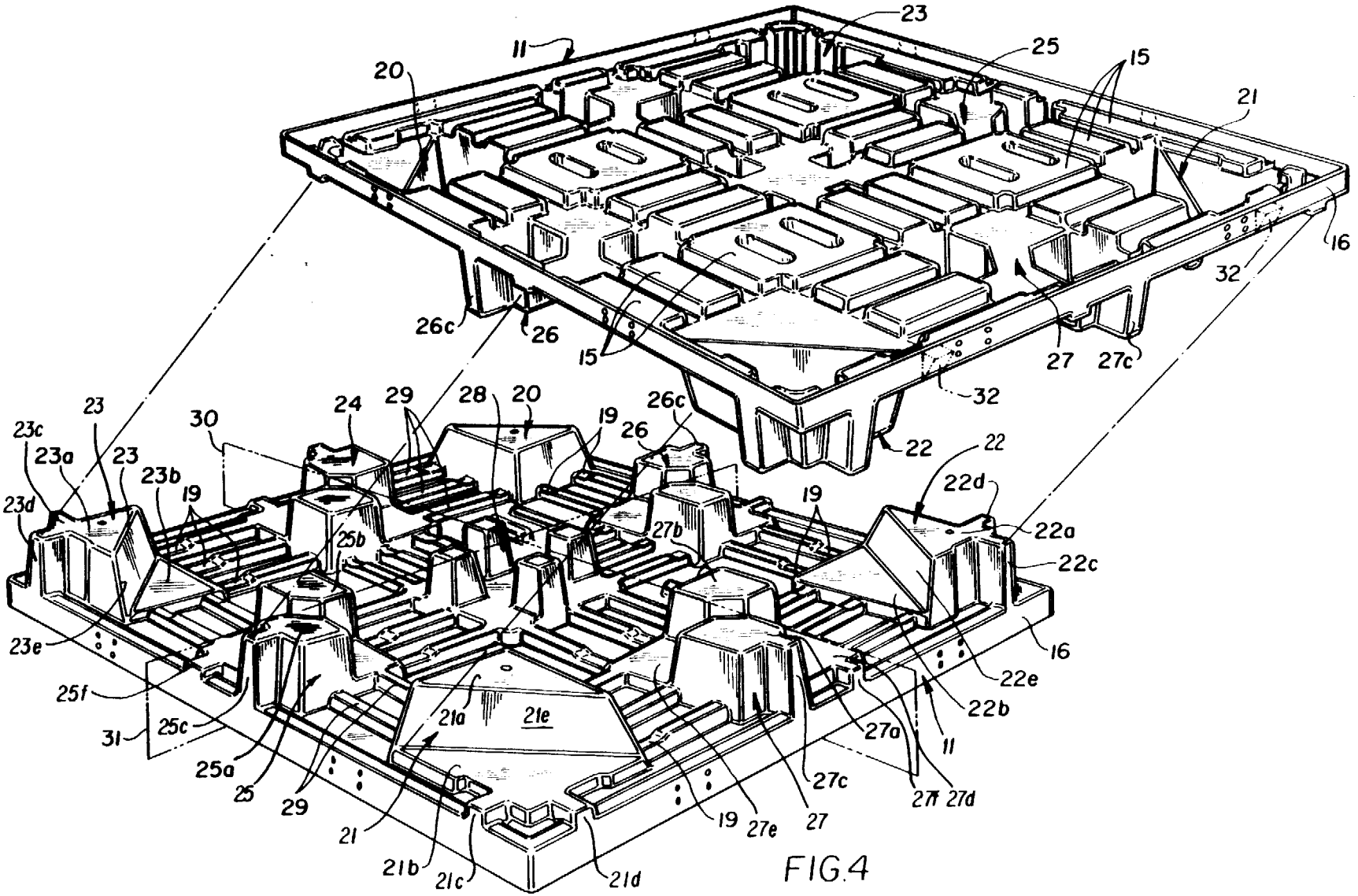
FIG. 4 is a perspective view showing adjacent pallets spaced apart from each other in anti-shift interengagement orientation.

When assembled (FIG. 2), the package 10 is held together by a plurality of strapping bands 18, preferably four, with one on each side of each center line, which bands are located and retained in position against lateral movement by banding grooves 19 (best seen in FIG. 4).

When in stacked condition (FIG. 3), the weight of upper containers is transmitted from pallet to adjacent inverted pallet to sleeve, and likewise from sleeve to pallet to inverted pallet, the side walls formed by the sleeve thus being vertical-load-bearing members, and the payload within the container thus bearing no significant portion of the vertical load. Cooperation between sleeve 13 and pallet 11, via rim 16 and groove 17, serves to provide outwardly directed forces about the periphery of the pallet thus providing dimensional stability to same and resisting undue pallet flexure when loaded, and further serves at the same time to define said sleeve periphery at both the top and bottom thereof and provide inwardly directed peripheral forces resisting outward bowing of the side walls of said sleeve in planes perpendicular to the pallets when under load.

The strapping bands 18 serve to aid and insure said sleeve/rim cooperation. Further, when tightened to secure the pallets and sleeve of the assembled container together (FIG. 2), the bands 18 also cooperate with the walls of sleeve 13, in that inwardly directed force is provided by the bands to the side walls of sleeve 13 to resist buckling thereof in a plane parallel to the pallets, and outwardly directed force is provided by the side walls to bands 18, aiding them to remain taut and the container 10 to remain secured.

Figure 2:
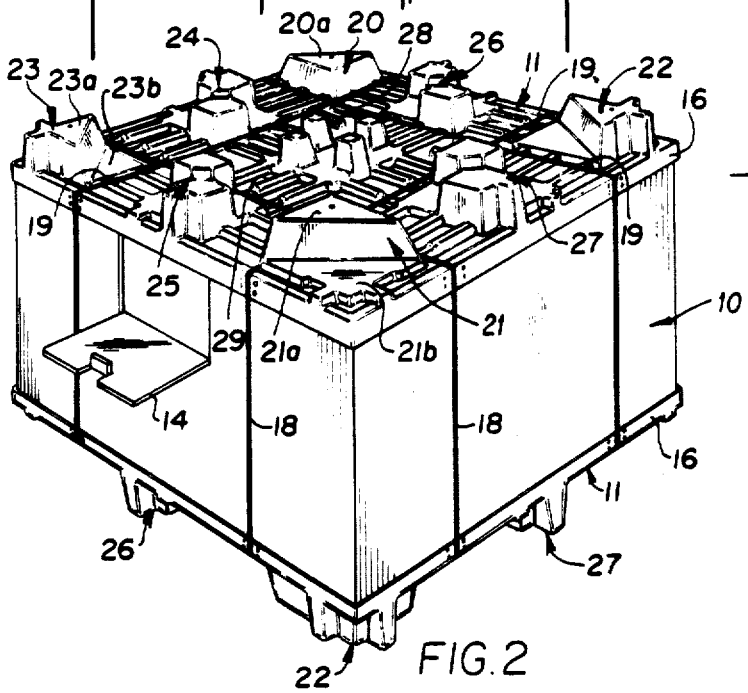
FIG. 2 is an isometric assembly view of said container.

As best seen in FIGS. 2 and 4, the pallet 11 has nine supporting foot means 20 through 28, namely, corner foot means 20–23 positioned in respective corner areas of the pallet, intermediate foot means 24–27 positioned between adjacent corner foot means, and central foot means 28 positioned centrally of the pallet. The foot means 20–28 provide a total of 16 projecting members depending from the pallet 11 when it is serving as a bottom of a container and adapted to act as vertical supporting legs. Of these, there is similarity of structure between foot means 20 and 21, each of which has a single projecting member, foot means 22 and 23, each of which also has a single projecting member, and intermediate foot means 24–27, each of which has two projecting members. Central foot means 28 has four projecting members in staggered array, and a particular semi-symmetrical disposition about either center line or either diagonal as shown.

Each of the foot means 20 through 28 comprises, as aforesaid, one or more projecting members extending away from the planar base 15 and terminating more or less in a common plane, and an adjacent corresponding number of platform members. For example, referring to FIG. 7, the intermediate foot means 27 there shown has two projecting members 27a and 27b and two platform members 27d and 27e, as do the similar foot means 24 through 26. The projecting members of the latter intermediate foot means 24–26 are respectively designated at 24a, 24b; 25a, 25b; and 26a, 26b in FIG. 7, and the platform members of the intermediate foot means 24–26 are respectively designated at 24d, 24e; 25d, 25e; and 26d, 26e in FIG. 7. The corner foot means 22 has a projecting member 22a and a platform member 22b, as do the similar foot means 20, 21 and 23. The projecting members of the corner foot means 20, 21, 23 are respectively designated at 20a, 21a, 23a, and the respective platform members are designated at 20b, 21b, 23b. The central foot means 28 has four projecting members, 28a, 28b, 28c, 28d, with platform members 28e, 28f, 28g, 28h disposed therebetween.

Figure 7:
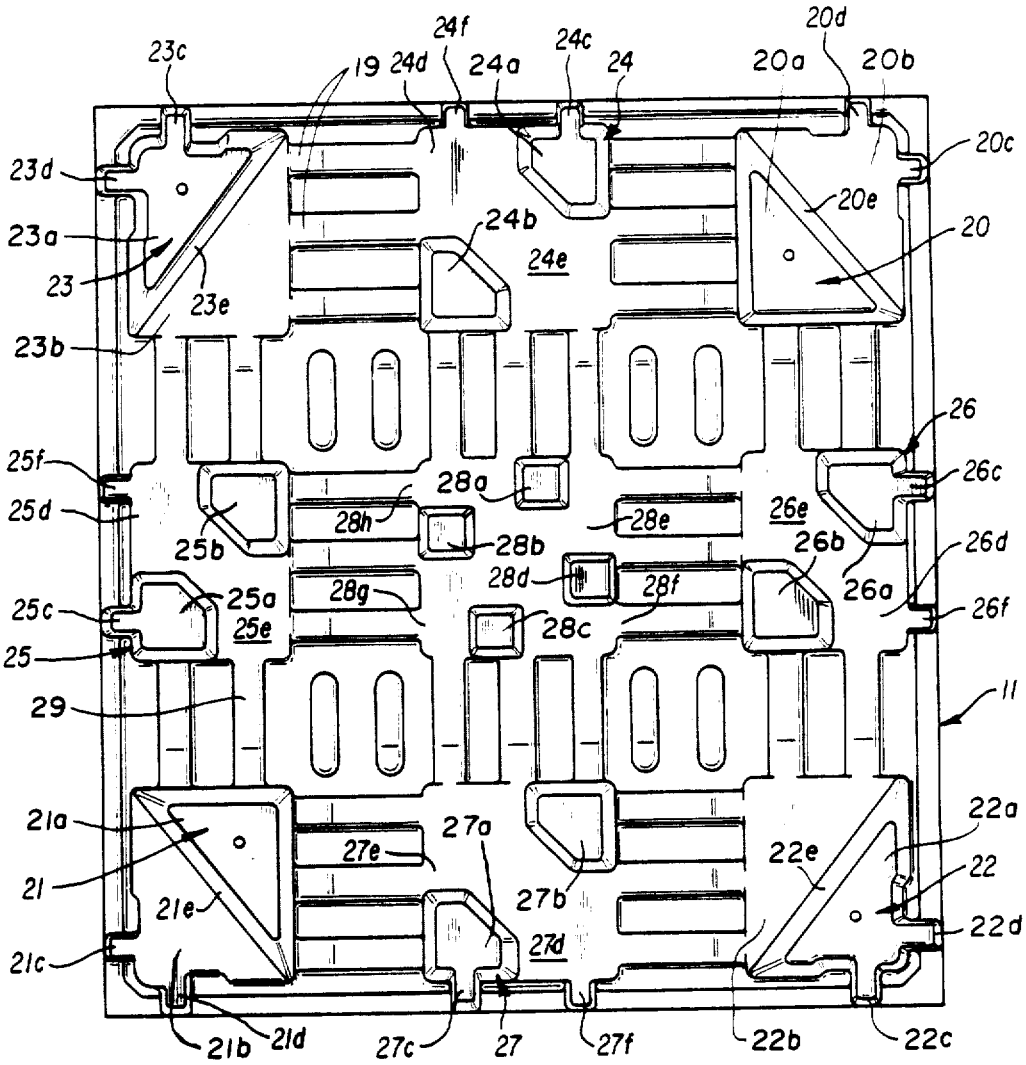
FIG. 7 is a plan view of the exterior surface of the pallet.
Figure 8:
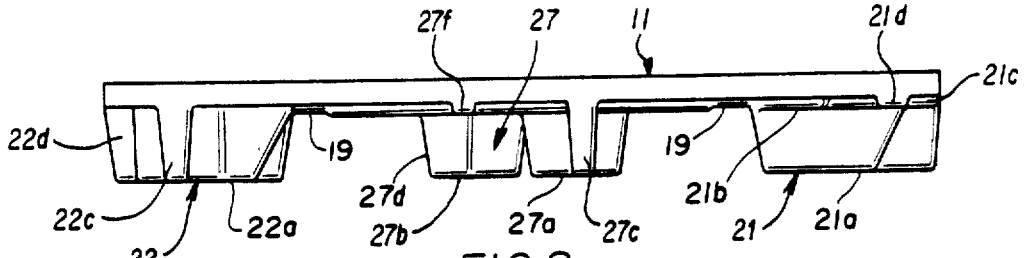
FIG. 8 is an end elevation view of the pallet, the opposite end elevation view being the same.
Figures 9, 10, 11, 12:
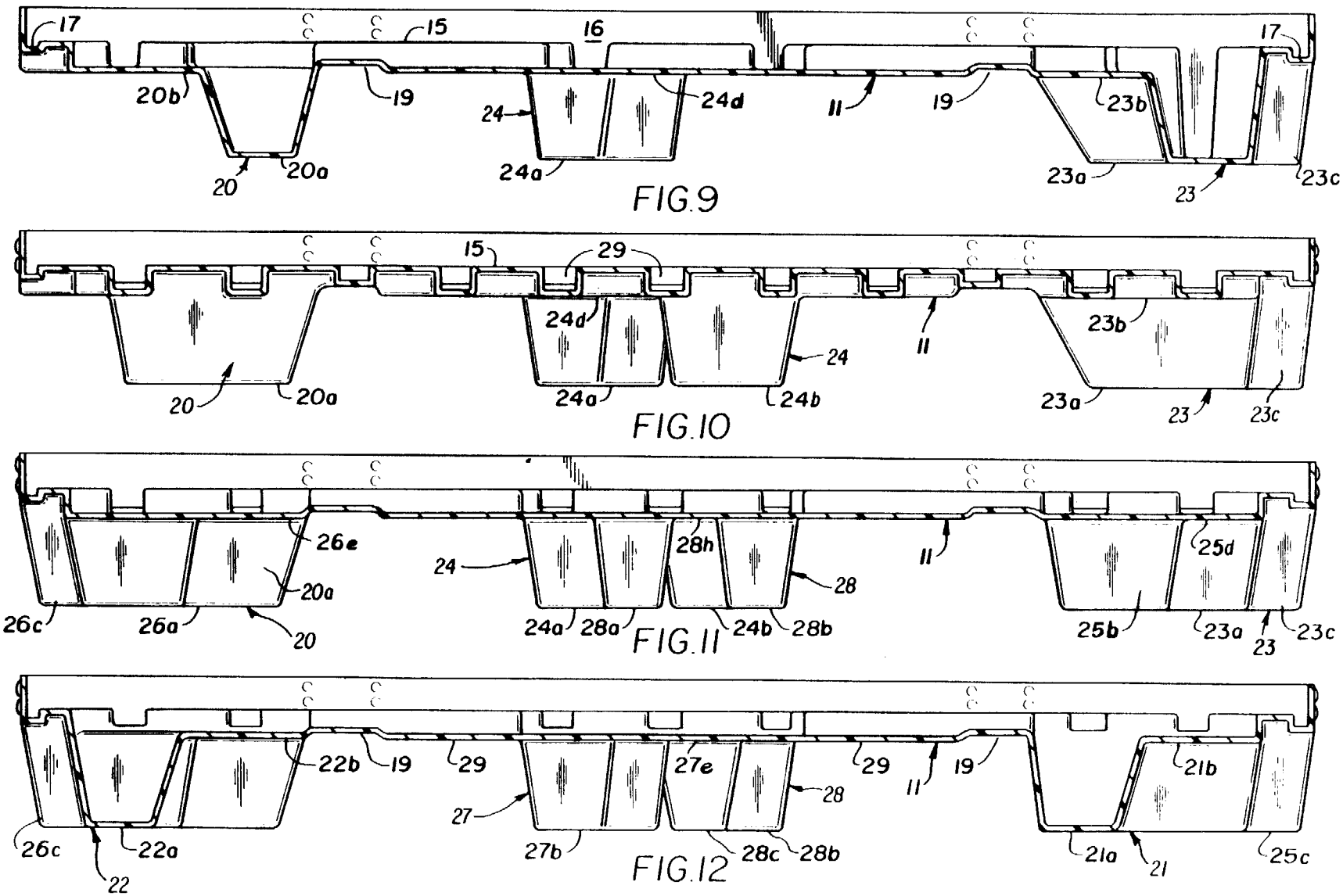
FIG. 9 is a sectional elevation view of the pallet, taken along the cutting plane 9—9 of FIG. 5.
FIG. 10 is a sectional elevation view of the pallet, taken along the cutting plane 10—10 in FIG. 5.
FIG. 11 is a sectional elevation view of the pallet, taken along the cutting plane 11—11 in FIG. 5.
FIG. 12 is a sectional elevation view of the pallet, taken along the cutting plane 12—12 in FIG. 5.

From the foregoing description of the corner foot means 20–23, and with particular reference to FIGS. 2, 4 and 7, it can be appreciated that the projecting foot members of each diagonally opposed pair of corner foot means 20, 21 and 22, 23, respectively, are not only similarly shaped, but they also provide respective diagonally opposed pairs of side engagement surfaces 20e, 21e and 22e, 23e. It is to be noted that the side engagement surfaces of each diagonally opposed pair face opposite directions from each other, thereby providing the lateral anti-shift interengagement between adjacent pallets 11 when in stacked relationship. It should also be noted that the projecting members 20a, 21a, 22a, 23a of the corner foot means, as well as all the other projecting members of all the other foot means 24–28, are hollow and constructed so as to be nestably engaged with projecting members of another substantially identical unloaded pallet facing in the same direction and correspondingly oriented with respect to each other, as indicated earlier herein. Thus, a relatively large number of unloaded pallets 11 may be nestably stacked so as to occupy less space when being stored or shipped.

To further aid in the anti-shift interengagement between adjacent pellets when in stacked relationship, it is to be noted that the side engagement surfaces of the projecting members of one of the diagonally opposed pairs of corner foot means, e.g., the corner foot means 20, 21, extend at a substantially right angle with respect to those side engagement surfaces of the projecting members of the other pair of diagonally opposed corner foot means 22, 23. Additionally, it is preferred that the side engagement surfaces 20e, 21e, 22e, 23e of each respective pair of diagonally opposed corner foot means extend substantially parallel to each other.

The projecting member 22a of the corner foot means 22 is further provided with vertical-load-bearing support buttresses 22c and 22d and the projecting member 23a of the corner foot means 23 is similarly provided with vertical-load-bearing support buttresses 23c and 23d. The projecting member 27a of the intermediate foot means 27 is provided with a vertical-load-bearing support buttress 27c, and projecting members 24a, 25a and 26a of the intermediate foot means 24, 25 and 26 are likewise provided with vertical-load-bearing buttresses 24c, 25c and 26c.

In corresponding fashion, the platform members of certain foot means are also provided with vertical-load-bearing support buttresses. Thus, platform member 21b of corner foot means 21 is provided with buttresses 21c and 21d, as is platform member 20a of corner foot means 20 provided with buttresses 20c and 20d. Similarly, platform member 27d of intermediate foot means 27 is provided with buttress 27f, and platform members 24d, 25d and 26d of intermediate foot means 24, 25 and 26 are provided with buttresses 24f, 25f, and 26f.

Figure 3:
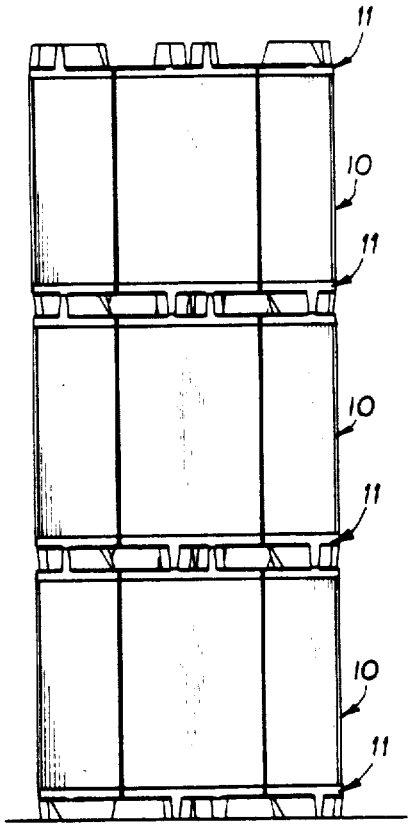
FIG. 3 is an elevation view of a stack of three of said containers wherein the foot means of adjacent pallets engage each other so as to prevent lateral shifting between containers.

When containers are stacked as in FIG. 3, so that the bottom pallet of an upper container is adjacent to and in interengaged abutting relation with the inverted top pallet of a lower container, the buttresses 22c and 22d of the projecting member 22a of corner foot means 22 and the buttresses 23c and 23d of the projecting member 23a of corner foot means 23 abut and are in vertical-load-supporting relation with either the corresponding buttresses 21c and 21d of platform member 21b of corner foot means 21 or the buttresses 20c and 20d of the platform member 20b of corner foot means 20, respectively, depending on inverted pallet orientation. Similarly, buttress 27c of projecting member 27b of intermediate foot means 27 abuts and is in vertical-load-supporting relation with either buttress 27f of platform member 27d of intermediate foot means 27 of the adjacent pallet, or of similar buttress 24f, depending upon orientation, and the same is so as to the buttresses 24c, 25c and 26c of projecting members 24b, 25b, and 26b, which abut the appropriate buttresses 24f, 25f and 26f of platform members 24d, 25d, and 26d.

These respective pairs of abutting projecting member buttresses and platform member buttresses serve as the principal vertical-load-bearing means of the containers when in stacked relation, and transmit said vertical loads from pallet to inverted pallet to sleeve, as aforesaid. As can be seen from the drawings, such buttresses at one and the same time serve as well to both stiffen their respective projecting members and to provide vertical support beneath said sleeve-receiving groove. The remainder of the more or less horizontally planar portions of the respectively corresponding pairs of projecting members and platform members assume an auxiliary vertical support function to an extent dependent upon the degree of pallet flexure under load.

That is, the inverted pallet acting as container top will naturally sag a little to an extent permitted by cooperation between the rim and sleeve, as augmented by the banding forces, all as aforesaid. Such sag, when added to included tolerances and clearances designed in for ready mold-release, creates a small vertical space between respectively mating corresponding projecting members and platform members of a pair of adjacent interengaged pallets. Such space will be taken up only as the bottom pallet of the next higher container flexes under load to an extent permitted by rim/sleeve/band cooperation. Only then, and to that extent, do such auxiliary surfaces assume a vertical support role.

In order to provide improved anti-shift engagement of adjacent mutually inverted pallets, the engagement surfaces of the respective projecting members of the foot means which abut each other in shift-resisting engagement, such as the surface 22e (FIGS. 4 and 7) of the projecting member 22a of corner foot means 22 and one of the two surfaces with which it will mate projecting on orientation, such as surface 21e of depending member 21a of corner foot means 21, are each somewhat tapered. Such taper or bevel, which also aids in mold release, will when taken together with designed-in tolerances, result in a small clearance between the mating surfaces. Such clearance aids ease of stackability, tends to prevent jamming or distortion of such depending or projecting members when the containers are loaded and in stacked condition, and minimizes the probability of misalignment during stacking without requiring great skill and precision from the fork lift operator.

Thus, an important feature of this invention lies in the provision of separate portions of the foot means principally directed to the vertical support function—i.e., the respectively abutting pairs of buttresses—whereas still other separate portions of the foot means are assigned the anti-shift engagement function—i.e., the abutting surfaces described above. In this way, stackability is enhanced and stability is increased while foot jamming and distortion is eliminated or minimized. When the salutary effects of such different portions being assigned different functions are added to the effect of the aforementioned clearances, the net result is that the fork lift operator need have only minimal precision and skill during stacking operations, since misalignment probabilities are minimized, yet the depth of the anti-shift interengagement provides for great stability.

To permit the desired interengagement of the adjacent pallets while providing the desired vertical support function in medial areas of stacked containers, it will be best observed in FIG. 7 that the projecting members 28a–28e of central foot means 28 are arranged to present pairs of projecting members wherein the two projecting members constituting each such pair are diagonally offset along opposite sides of a center line (see center lines 30 and 31 in FIG. 4) passing through the shipping pallet and also diagonally offset on opposite sides of another center line extending transversely of and across the first-named center line. It can also be appreciated that each of the intermediate foot means 24–27 constitutes a pair of projecting members, e.g., 24a and 24b, which are offset relative to each other along opposite sides of a respective pallet center line passing therebetween.

Additional rigidity for the pallet base is provided by a network of molded-in stiffener ribs indicated generally by the number 29 (FIGS. 4 and 7), which ribs interconnect said foot means one to another, and are disposed parallel to one or another pallet sides in a generally conventional manner.

The container 10, and the pallet 11 as such, can accommodate four-way fork lift entry via channels or passages between the several rows of foot means 20 to 28, said channels being adjacent to and/or inclusive of the regions through which the bands 18 extend, the bands 18 themselves being disposed in the banding grooves 19 so that they are not disturbed by the lifting forks, which engage the adjacent portions of the reinforcing ribs 29.

Figure 14A:
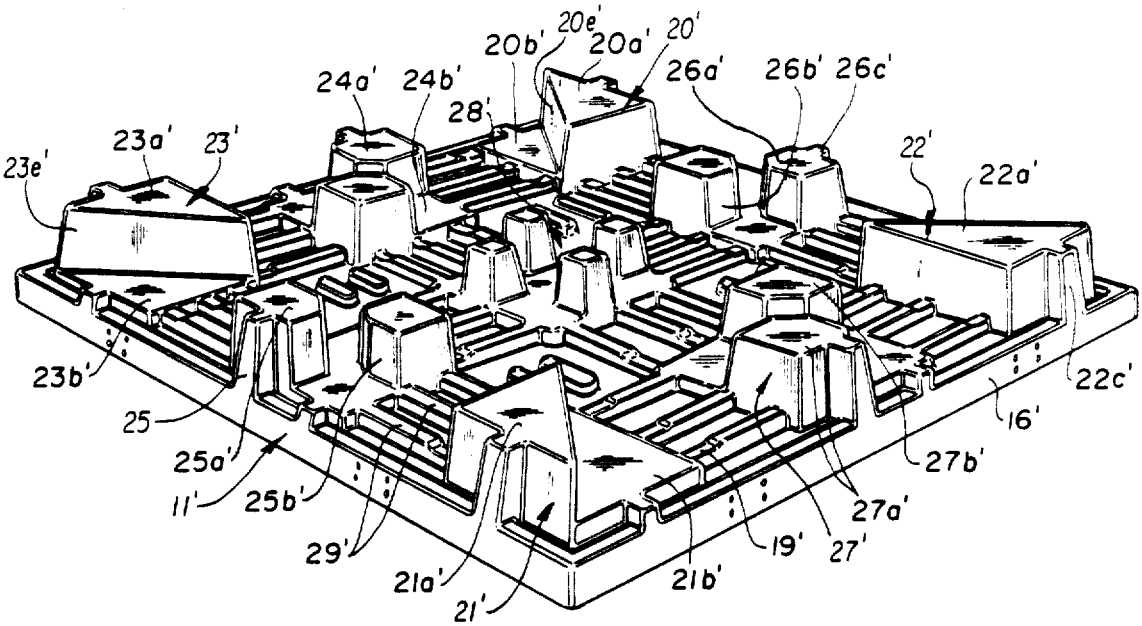
FIG. 14a is a perspective view of the exterior surface of a square pallet in accordance with an alternative embodiment of the invention.
Figure 14B:
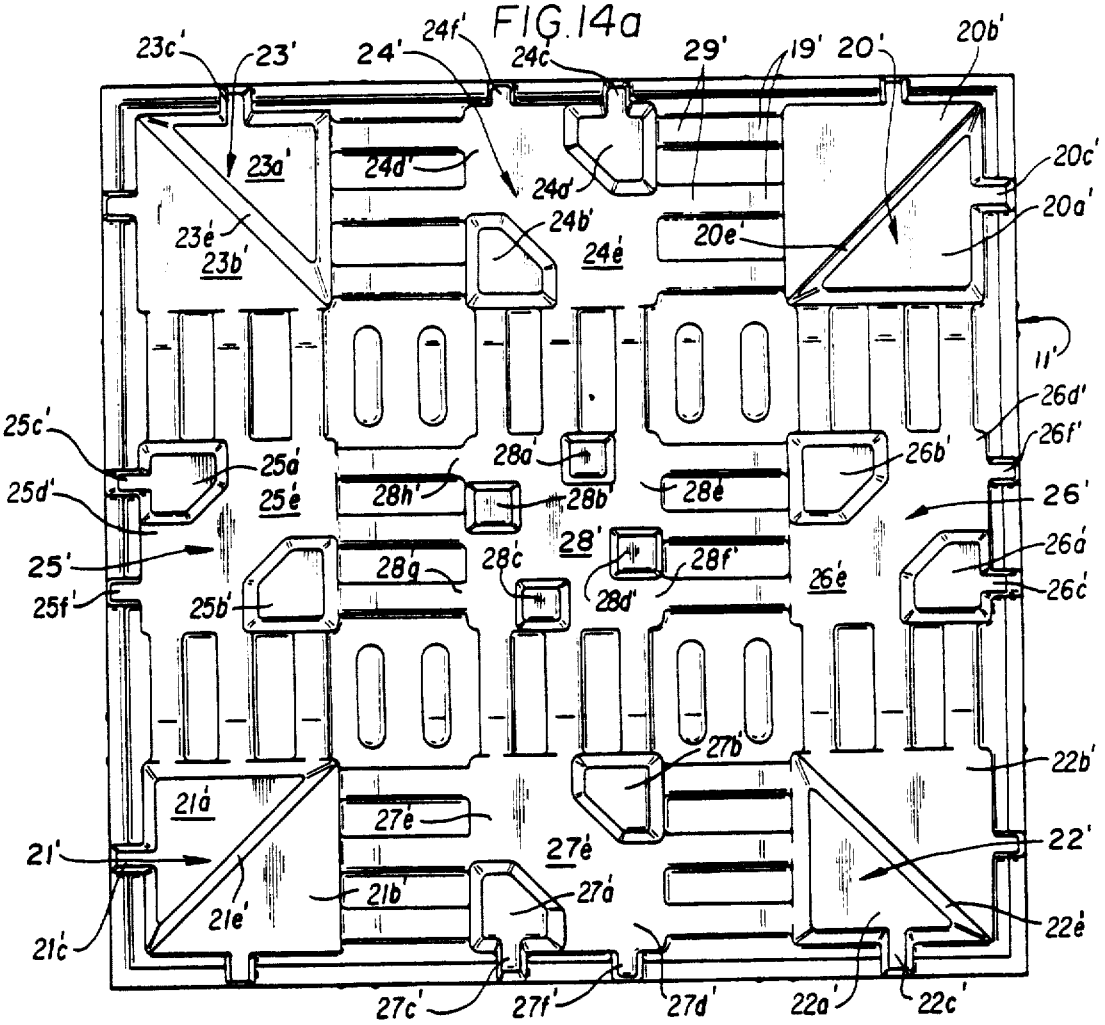

As aforesaid, the pallet 11 may be rectangular, and may also if desired have a square rectangular configuration as shown in the drawings at FIGS. 14a and 14b. Other regular geometrical shapes may also be utilized, such as for example, octagonal shapes or the like.

The projecting member/platform member pattern of the foot means 20 to 28 exhibits odd symmetry, with the projecting members of each foot means being symmetrically disposed with respect to the platform members of a corresponding foot means in mirror image relation thereto about a first central plane normal to the plane of the base 15, and about a second central plane also normal to the plane of base 15 but normal to the first central plane.

For example, the projecting member 22a of the foot means 22 is the mirror image of the platform member 21b of the foot means 21, with respect to a central or "mirror" plane 30 (FIG. 4); with said projecting member 22a being the mirror image of the platform member 20b of the foot means 20 with respect to the central "mirror" plane 31, the planes 30 and 31 being mutually orthogonal.

Similarly, each projecting member of each of the other foot means exhibits mirror image symmetry with respect to the respective platform member of a corresponding foot means (regarding each of the foot means 24 through 28 as comprising two foot means for this purpose) about the planes 30 and 31.

This mirror image symmetry insures that inversion of the pallet 11 by inversion of rotation around either of the center lines in the base plane 15 corresponding to the intersection of the planes 30 and 31 therewith, results in a projecting member/platform member pattern of the foot means 20 to 28 which enters into shift-resisting engagement with the unrotated or uninverted projecting member/platform member pattern, so that as best shown in FIG. 4, an uninverted pallet 11 may mate in shift-resisting engagement with an inverted pallet 11 in the angular orientation shown in FIG. 4, as well as in an angular orientation differing by 180° therefrom, i.e., with only one of the pallets 11 shown in FIG. 4 being rotated through an angle of 180° relative to the base 15. Thus, when regular rectangular pallets 11 are employed as top and bottom of containers 10, proper stacking with anti-shift engagement is accomplishable with the higher container of a stacked pair oriented in either of two directions, 180° apart from each other, so long as one of the long edges of the upper bottom pallet is aligned with one of the long edges of the lower inverted top pallet.

Also, as is evident from the drawings, the projecting member/platform member pattern on the foot means 20 to 28 is such that rotation of the pallet 11 through an angle of 180° in the plane of the base 15, results in said pattern being unchanged, due to said mirror image symmetry. This feature permits the pallets to be nested with each other, i.e., stacked atop each other with all pallets facing the same direction, with a 180° rotation of adjacent pallets having no effect on nesting.

Thus, when rectangular pallets are utilized, a fork lift operator may stack containers 10 merely by generally aligning the long or short sides of adjacent pallets with each other; and the pallets may be similarly nested for storage purposes or for transport for re-use, when unloaded.

FIGS. 14a and 14b illustrate an alternative pallet structure in which increased corner support is provided by rotating the foot means 20 and 21 so that one side of the depending member of each of said foot means lies along the outer rim 16, said mirror image symmetry being naturally retained, and as well, said vertical-load-bearing buttresses being similarly provided.

In the case where the pallet 11' is square, adjacent mutually inverted pallets 11' will enter into anti-shift engagement in any angular orientation in which the rims 16' are aligned, i.e., in angular orientations differing by any multiple of 90° in the plane of the base 15'. Such 90° stackability is permitted, as well, as a result of the aforesaid rotation of foot means 20 and 21.

When square pallets are utilized, a fork lift operator may stack palletized containers 10 merely by placing them atop of each other so that the pallet rims 16 are parallel to each other; and the pallets can be nested for storage or transport purposes by visually aligning corresponding foot means, it never being necessary to rotate any pallet more than 90° to produce either stacking or nesting alignment.

Other than the square configuration of pallet 11' and the arrangement of the corner foot means 20', 21' of FIGS. 14a and 14b, the pallets 11, 11' may be of similar construction. Therefore, those parts of pallet 11' corresponding to like or similar parts of pallet 11 will bear the same reference characters, where applicable, with the prime notation added to avoid repetitive description.

Pallets have been constructed having dimensions of 44×48×5 inches high, utilizing vacuum formed polyethylene sheet with an initial sheet thickness on the order of 0.220 inch, and as well from both lighter and heavier sheet stock. These pallets weigh approximately 22 pounds.

Utilizing a triple-wall corrugated cardboard sleeve 13, containers 10 were assembled with internal loads of 650 pounds per container. Such containers were repeatedly stacked four high (container height about 44 inches), without any noticeably significant bowing or buckling of said sleeves, and without undue flexure of said pallets. Said 650 pounds has been determined to represent a much higher net payload per cubic unit of warehouse volume, as well as per square unit of warehouse floor space, than was realizable under previous systems such as the bailing wire and wood slat crates. Of course, ordinary cardboard cartons can achieve similar warehousing densities, but are typically not reusable and do not provide the anti-shift stability desired for safety of product and personnel.

Figure 13:
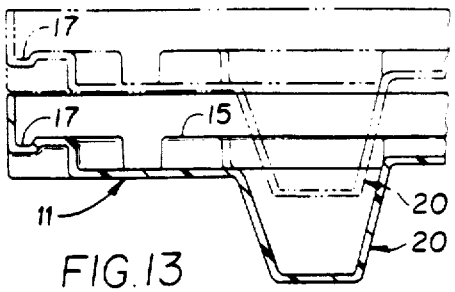
FIG. 13 is a partial sectional elevation view demonstrating the nesting capability of adjacent pallets for storage purposes.

When the palletized containers are delivered to the job site, they may, if desired, be oriented so that either pallet is on the bottom, so that, when the bands 18 are cut, unloading may proceed on either a first-in/first-out basis or a last-in/first-out basis. When the component parts thereof are then disassembled, the pallets 11 are stacked in nesting relationship as illustrated in FIG. 13, the floor panels 12 are stacked, and the sleeves 13 are folded flat and stacked, said sleeves being suitably hinged at the corners, and thus readily collapsible in a direction perpendicular to their walls. Thus, these major parts of palletized container assembly may be returned to the point of origin for repetitive use, at a very high component per cubic unit shipping space density, thus substantially reducing packaging and shipping costs.

A further advantage is found in the fact that the weight of the packaging components of such container—i.e., two pallets, one sleeve, four bands, and two floor panels 12—is substantially constant from container to container, as compared, for example, to the wooden crates which vary widely in weight. Since tare weight is thus constant, only the loaded container 10 need be weighed to determine net payload weight, whereas previously the unloaded and loaded weights had to be taken separately and recorded.

Moreover, because of the aforesaid ease of stacking, minimal orientation requirements, and four-way fork lift entry, it has been determined that a truck load of loaded containers may be either loaded or unloaded using fewer and less-skilled fork lift operators, as compared to previous container systems. Accordingly, packaging and shipping costs are still further reduced, and the damage to trailer walls caused by wooden boxes is also avoided.

If desired, the peripheral rim 16 of the pallet 11 may be still further reinforced by additional outwardly extending buttresses 32 as shown in FIG. 4, with at least two buttresses being provided on each side wall of said rim.

In the drawings and specification, there have been set forth preferred embodiments of the invention, and although specific terms are employed, they are used in a generic and descriptive sense only and not for purposes of limitation.

That which is claimed is:

1. A shipping pallet of [the type formed of a single sheet of material and constructed] *the forkliftable type and of unitary plastic construction* for use with another substantially identical pallet so as to serve as a bottom or top wall of a shipping container for transporting and storing a load, said shipping pallet having a generally planar base and a plurality of foot means projecting from the base, said foot means including corner foot means positioned in respective corner areas of the pallet, central foot means positioned centrally of the pallet, and intermediate foot means positioned between adjacent corner foot means, and wherein each of the foot means comprises at least one projecting member and a *substantially flat* platform member adjacent each projecting member, *all of said projecting members being of hollow construction open at the upper end and tapered for nestability thereof when empty pallets are stacked with each other, said projecting members also having a height of a substantial portion of the overall height of the pallet and being arranged so as to define forklift passages between the projecting members of a substantially uniform overall height for receiving the arms of a forklift, said projecting members having flat bottom bearing surfaces for vertical load distribution and flat tapered side wall bearing surfaces for self aligning stackability, said flat tapered side walls having an overall height at least several times greater than their thickness and substantially the same as the forklift passages,* and said projecting members and said platform members [being so constructed and arranged relative to each other] *of each foot means being symmetrically disposed with respect to the centerlines of the pallet such that said projecting members are in mirror image relation to the platform members of the corresponding foot means positioned on the opposite side of the centerlines, so* that the pallet when in use in a predetermined position of orientation, and at least another position of orientation 180° out-of-phase therefrom, may be stacked in mating relation to a substantially identical inverted pallet and with the projecting members abutting the platform members of the inverted pallet and *the flat tapered side wall bearing surfaces thereof* serving to provide a lateral anti-shift interengagement between the adjacent pallets in a plurality of directions *and wherein said height and said hollow construction and said symmetrical arrangement of said projecting members are such that said projecting members may be nestably engaged with projecting members of another substantially identical unloaded pallet facing in the same direction and in a predetermined position of orientation and at least another position of orientation 180° out-of-phase therefrom, whereby a relatively large number of unloaded pallets may be nestably stacked so as to occupy considerably less space when being stored or shipped.*

2. A shipping pallet according to claim 1 wherein the pallet has substantially the same length as the width thereof, and wherein the projecting members and the platform members are so arranged relative to each other that the pallet when in use may be reoriented at any other position of orientation of an integral multiple of 90° out-of-phase from its previous stacked position relative to the other shipping containers.

3. A shipping pallet according to claim 1 or 2 wherein said projecting members of all said foot means are arranged in such spaced relationship as to provide a pair of spaced parallel passages extending along opposite sides of a center line passing through the shipping pallet and another pair of spaced parallel passages extending transversely of the first-named passages, with the passages of each pair being arranged to accommodate the arms of a fork lift type transporting vehicle.

4. A shipping pallet according to claim 1 or 2 wherein a peripherally positioned rim extends around said planar base and projects outwardly therefrom in a direction opposite from said foot means and wherein a sleeve receiving groove is provided alongside and is surrounded by said rim.

5. A shipping pallet according to claim 1 or 2 wherein each of at least some of said projecting members of at least some of said corner foot means include a buttress support portion, and each of at least some of said platform members also include a buttress support portion to enhance the stability and strength of the pallet.

6. A shipping pallet according to claim 1 or 2 wherein said central foot means comprises at least a pair of projecting members diagonally offset along the opposite sides of a center line passing through the shipping pallet and also diagonally offset on opposite sides of another center line extending transversely of and across said first-named center line.

7. A shipping pallet according to claim 1 or 2 wherein said intermediate foot means each comprises a plurality of projecting members diagonally offset along opposite sides of a pallet center line passing therebetween.

8. A shipping pallet according to claim 1 or 2 wherein said central foot means comprises two pairs of projecting members with each pair being diagonally offset along opposite sides of a center line passing through the shipping pallet and also being diagonally offset on opposite sides of another center line extending transversely of and across said first-named center line, and wherein the intermediate foot means each comprises a pair of projecting members diagonally offset along opposite sides of a pallet center line passing therebetween.

9. A shipping container for containing and transporting a load therein and so constructed as to be adapted to be stacked in mating relation with other shipping container of substantially the same construction, said shipping container comprising upper and lower pallets of substantially identical construction *and of the forkliftable type*, said upper and lower pallets being inverted relative to each other so as to be adapted to be stacked in mating relation to the pallets of adjacent containers, means interconnecting the upper and lower pallets of the shipping container for maintaining the integrity of the shipping container, each of said pallets having a generally planar base and a plurality of foot means projecting from the base, said foot means including corner foot means positioned in respective corner areas of the pallet, central foot means positioned centrally of the pallet, and intermediate foot means positioned between adjacent corner foot means, each of the foot means comprising at least one projecting member and a *substantially flat* platform member adjacent each projecting member, *all of said projecting members being of hollow construction open at the upper end and tapered for nestability thereof when empty pallets are stacked with each other, said projecting members also having a height of a substantial portion of the overall height of the pallet and being arranged so as to define forklift passages between the projecting members of a substantially uniform overall height for receiving the arms of a forklift, said projecting members having flat bottom bearing surfaces for vertical load distribution and flat tapered side wall bearing sur-*

*faces for self aligning stackability, said flat tapered side walls having an overall height at least several times greater than their thickness and substantially the same as the forklift passages,* the projecting members and the platform members [of each pallet being so constructed and arranged relative to each other] *of each foot means being symmetrically disposed with respect to the centerlines of the pallet such that said projecting members are in mirror image relation to the platform members of the corresponding foot means positioned on the opposite side of the centerlines, so* that the projecting members of each pallet are adapted to abut the platform members of a pallet of an adjacent shipping container *and the flat tapered side wall bearing surfaces thereof serving* for providing a lateral anti-shift interengagement between adjacent shipping containers, and wherein the projecting members and the platform members of each pallet are [also] *thus* so constructed and arranged that the shipping container, when in the stack, is adapted to be reoriented in at least another position of orientation 180° out-of-phase from its previous stacked position relative to other shipping containers in the stack, with the pallets of the reoriented shipping container still adapted to be in mating relation to the adjacent pallets of adjacent shipping containers in the stack and with the projecting members of each pallet of the reoriented shipping container adapted to be abutting the platform members of adjacent pallets *and wherein said height and said hollow construction and said symmetrical arrangement of said projecting members are such that said projecting members may be nestably engaged with projecting members of another substantially identical unloaded pallet facing in the same direction and in a predetermined position of orientation and at least another position of orientation 180° out-of-phase therefrom, whereby a relatively large number of unloaded pallets may be nestably stacked so as to occupy considerably less space when being stored or shipped.*

10. A shipping container according to claim 9 wherein a peripherally positioned rim extends around each planar base and projects outwardly therefrom in a direction opposite from the foot means of the respective pallet, with a sleeve positioned between said upper and lower pallets of the container, and wherein each pallet is provided with a sleeve receiving groove therein extending alongside and surrounded by said rim with opposite end portions of said sleeve being positioned in the grooves in the upper and lower pallets.

11. A stack of shipping containers containing articles therein, each shipping container comprising upper and lower pallets of substantially the same construction *and of the forkliftable type,* said upper and lower pallets of each shipping container being inverted relative to each other and being in mating relation to the pallets of adjacent containers of the stack, means interconnecting the upper and lower pallets of each shipping container for maintaining the integrity of the shipping container, each of said pallets having a generally planar base and a plurality of foot means projecting from the base, said foot means including corner foot means positioned in respective corner areas of the pallet, central foot means positioned centrally of the pallet, and intermediate foot means positioned between adjacent corner foot means, each of the foot means comprising at least one projecting member and a *substantially flat* platform member adjacent each projecting member, *all of said projecting members being of hollow construction open at the upper end and tapered for nestability thereof when empty pallets are stacked with each other, said projecting members also having a height of a substantial portion of the overall height of the pallet and being arranged so as to define forklift passages between the projecting members of a substantially uniform overall height for receiving the arms of a forklift, said projecting members having flat bottom bearing surfaces for vertical load distribution and flat tapered side wall bearing surfaces for self aligning stackability, said flat tapered side walls having an overall height at least several times greater than their thickness and substantially the same as the forklift passages,* the projecting members and the platform members [of each pallet being so constructed and arranged] *of each foot means being symmetrically disposed with respect to the centerlines of the pallet such that said projecting members are in mirror image relation to the platform members of the corresponding foot means positioned on the opposite side of the centerlines, so* that the projecting members of each pallet abut the platform members of a pallet of an adjacent shipping container [and provide] *and the flat tapered side wall bearing surfaces thereof serving for providing* a lateral anti-shift interengagement between adjacent shipping containers, and wherein the projecting members and the platform members of each pallet are [also] *thus* so constructed and arranged that each shipping container of the stack may be reoriented at at least another position of orientation 180° out-of-phase from its previous stacked position relative to the other shipping containers, with the pallets of the reoriented shipping container still being in mating relation to the adjacent pallets and with the projecting members of each pallet of the reoriented shipping container abutting the platform members of the adjacent pallets *and wherein said height and said hollow construction and said symmetrical arrangement of said projecting members are such that said projecting members may be nestably engaged with projecting members of another substantially identical unloaded pallet facing in the same direction and in a predetermined position of orientation and at least another position of orientation 180° out-of-phase therefrom, whereby a relatively large number of unloaded pallets may be nestably stacked so as to occupy considerably less space when being stored or shipped.*

12. A stack of shipping containers according to claim 11 wherein each of the upper and lower pallets of the containers are of substantially the same length and width, and wherein the projecting members and platform members of each pallet are so constructed and arranged that each shipping container of the stack may be reoriented at any other position of orientation of an integral multiple of 90° out-of-phase from its previous stacked position relative to the other shipping containers, with the pallets of the reoriented shipping container being in mating relation to the adjacent pallets and with the projecting members of each pallet of the reoriented shipping container abutting the platform members of the adjacent pallets.

13. A stack of shipping containers according to claim 11 wherein each of the upper and lower pallets has a greater length than width and may be reoriented at only said position of reorientation 180° out-of-phase from its previous stacked position relative to the other shipping containers, with the pallets of the reoriented shipping container being in mating relation to the adjacent pallets and with the projecting members of each pallet of the reoriented shipping container abutting the platform members of the adjacent pallets.

14. A stack of shipping containers according to any one of claims 11, 12 or 13 wherein said foot means on each of said pallets are so constructed and arranged that the shipping containers may be forklifted from any side of the pallets.

15. A stack of shipping containers according to any one of claims 11, 12 or 13, wherein said projecting members of all said foot means of each pallet are arranged in such spaced relationship as to provide a pair of spaced parallel passages extending along opposite sides of a center line passing through the respective pallet and another pair of spaced parallel passages extending transversely of the first-named passages, with the passages of each pair being arranged to accommodate the arms of a fork lift type transporting vehicle.

16. A stack of shipping containers according to any one of claims 11, 12 or 13 wherein a peripherally positioned rim extends around each planar base and projects outwardly therefrom in a direction opposite from the foot means of the respective pallet and wherein a sleeve receiving groove is provided alongside and is surrounded by said rim.

17. A stack of shipping containers according to any one of claims 11, 12 or 13 wherein each of at least some of said projecting members of at least some of said corner foot means include a buttress support portion, and each of at least some of said platform members also include a buttress support portion to enhance the stability and strength of each respective pallet.

18. A stack of shipping containers according to any one of claims 11, 12 or 13 wherein each said central foot means comprises at least a pair of projecting members diagonally offset along opposite sides of a center line passing through the respective pallet and also diagonally offset on opposite sides of another center line extending transversely of and across said first-named center line.

19. A stack of shipping containers according to any one of claims 11, 12 or 13 wherein each intermediate foot means of each pallet comprises a plurality of projecting members diagonally offset along opposite sides of a respective pallet center line passing therebetween.

20. A stack of shipping containers according to any one of claims 11, 12 or 13 wherein said central foot means of each pallet comprises two pairs of projecting members with each pair being diagonally offset along opposite sides of a center line passing through the respective pallet and also being diagonally offset on opposite sides of another center line of the same pallet, with said other center line extending transversely of and across said first-named center line, and wherein each intermediate foot means of each pallet comprises a pair of projecting members diagonally offset along opposite sides of a pallet center line passing therebetween.

21. A shipping pallet of the *forkliftable* type which when unloaded may be nestably stacked with other like pallets, said pallet being [formed of a single sheet of material and constructed] *of unitary plastic construction* for use with another substantially identical pallet so as to serve as a bottom or top wall of a shipping container for transporting and storing a load, said shipping pallet having a generally planar base and a plurality of foot means projecting from the base, said foot means including corner foot means positioned in respective corner areas of the pallet, central foot means positioned centrally of the pallet, and intermediate foot means positioned between adjacent corner foot means, and wherein each of the foot means comprises at least one projecting member and *a substantially flat* platform member adjacent each projecting member, *all of said projecting members being of hollow construction open at the upper end and tapered for nestability thereof when empty pallets are stacked with each other, said projecting members also having a height of a substantial portion of the overall height of the pallet and being arranged so as to define forklift passages between the projecting members of a substantially uniform overall height for receiving the arms of a forklift, said projecting members having flat bottom bearing surfaces for vertical load distribution and flat tapered side wall bearing surfaces for self aligning stackability, said flat tapered side walls having an overall height at least several times greater than their thickness and substantially the same as the forklift passages,* and said projecting members and said platform members [being so constructed and arranged relative to each other] *of each foot means being symmetrically disposed with respect to the centerlines of the pallet such that said projecting members are in mirror image relation to the platform members of the corresponding foot means positioned on the opposite side of the centerlines, so* that the pallet when in use in a predetermined position [or] *of* orientation, and at least another position of orientation 180° out-of-phase therefrom, may be stacked in mating relation to a substantially identical inverted pallet and with the projecting [member] *members* abutting the platform members of the inverted pallet [and serving] *and the flat tapered side wall bearing surfaces thereof serving* to provide a lateral [antishift] *anti-shift* interengagement between the adjacent pallets in a plurality of directions, *and* wherein the respective projecting members of each diagonally opposed pair of said corner foot means have [side engagement] *said side wall bearing* surfaces facing in opposite directions from [the] each other for providing the lateral [anit-shift] *anti-shift* interengagement between adjacent pallets when in stacked relationship, and further wherein said *height and said hollow construction and said symmetrical arrangement of said* projecting members are [hollow and constructed so as to be nestably engaged with] *such that the* projecting members [of] *may be nestably engaged with* another substantially identical unloaded pallet facing in the same direction and in any of said positions of orientation, whereby a relatively large number of unloaded pallets may be nestably stacked so as to occupy considerably less space when being stored or shipped.

22. A nestable shipping pallet according to claim 21 wherein said side [engagement] *wall bearing* surfaces of the projecting members of one of said pairs of diagonally opposed corner foot means extend at a substantially right angle with respect to the side [engagement] *wall bearing* surfaces of the projecting members of the other pair of diagonally opposed corner foot means, and wherein the side [engagement] *wall bearing* surfaces of each diagonally opposed pair of corner foot means extend substantially parallel to each other.

23. A shipping container for containing and transporting a load therein and so constructed as to be adapted to be stacked in mating relation with other shipping containers of substantially the same construction *and of the forkliftable type*, said shipping container comprising upper and lower pallets of substantially identical construction and which when unloaded may be nestably stacked with other like pallets, said upper and lower pallets being inverted relative to each other so as to be adapted to be stacked in mating relation to the pallets of adjacent containers, means interconnecting the upper and lower pallets of the shipping container for maintaining the integrity of the shipping container, each of said pallets having a generally planar base and a plurality of foot means projecting from the base, said foot means including corner foot means positioned in respective corner areas of the pallet, central foot means positioned centrally of the pallet, and intermediate foot means positioned between adjacent corner foot means, each of the foot means comprising at least one projecting member and a *substantially flat* platform member adjacent each projecting member, *all of said projecting members being of hollow construction open at the upper end and tapered for nestability thereof when empty pallets are stacked with each other, said projecting members also having a height of a substantial portion of the overall height of the pallet and being arranged so as to define forklift passages between the projecting members of a substantially uniform overall height for receiving the arms of a forklift, said projecting members having flat bottom bearing surfaces for vertical load distribution and flat tapered side wall bearing surfaces for self aligning stackability, said flat tapered side walls having an overall height at least several times greater than their thick ess and substantially the same as the forklift passages,* the projecting members and the platform members [of each pallet being so constructed and arranged relative to each other] *of each foot means being symmetrically disposed with respect to the centerlines of the pallet such that said projecting members are in mirror image relation to the platform members of the corresponding foot means positioned on the opposite side of the centerlines, so* that the projecting members of each pallet are adapted to abut the platform members of a pallet of an adjacent shipping container *and the flat tapered side wall bearing surfaces thereof serving* for providing a lateral anti-shift interengagement between adjacent shipping containers, and wherein the projecting members and the platform members of each pallet are [also] *thus* so constructed and arranged that the shipping container, when in the stack, is adapted to be reoriented in at least another position of orientation 180° out-of-phase from its previous stacked position relative to other shipping containers in the stack, with the pallets of the reoriented shipping container still adapted to be in mating relation to the adjacent pallets of adjacent shipping containers in the stack and with the projecting members of each pallet of the reoriented shipping container adapted to be abutting the platform members of adjacent pallets, the respective projecting members of each diagonally opposed pair of said corner foot means of each pallet having *said* side [engagement] *wall bearing* surfaces facing in opposite directions from each other for providing the lateral anti-shift interengagement between adjacent pallets when in stacked relationship, and further wherein said *height and said hollow construction and said symmetrical arrangement of said* projecting members of each pallet are [hollow and constructed so as to be nestably engaged with] *such that the* projecting members [of] *may be nestably engaged with* another substantially identical unloaded pallet facing in the same direction and in any of said positions of orientation, whereby a relatively large number of unloaded pallets may be nestably stacked so as to occupy considerably less space when being stored or shipped.

24. A shipping container according to claim 23 wherein said side [engagement] *wall bearing* surfaces of the projecting members of one of said pairs of diagonally opposed corner foot means of each pallet extend at a substantially right angle with respect to the side [engagement] *wall bearing* surfaces of the projecting members of the other pair of diagonally opposed corner foot means of each pellet, and wherein the side [engagement] *wall bearing* surfaces of each diagonally opposed pair of corner foot means of each pallet extend substantially parallel to each other.

25. A shipping container according to claim 23 wherein a periphery positioned rim extends around each planar base and projects outwardly therefrom in a direction opposite from the foot means of the respective pallet, with a sleeve positioned between said upper and lower pallets of the container, and wherein each pallet is provided with a sleeve receiving groove therein extending alongside and surrounded by said rim with opposite end portions of said sleeve being positioned in the grooves in the upper and lower pallets.

26. A stack of shipping containers containing articles therein, each shipping container comprising upper and lower pallets of substantially the same construction *and of the forkliftable type* and which when unloaded may be stacked with other like pallets, said upper and lower pallets of each shipping container being inverted relative to each other and being in mating relation to the pellets of adjacent containers of the stack, means interconnecting the upper and lower pallets of each shipping container for maintaining the integrity of the shipping container, each of said pallets having a generally planar base and a plurality of foot means projecting from the base, said foot means including corner foot means positioned in respective corner areas of the pallet, central foot means positioned centrally of the pallet, and intermediate foot means positioned between adjacent corner foot means, each of the foot means comprising at least one projecting member and a *substantially flat* platform member adjacent each projecting member, *all of said projecting members being of hollow construction open at the upper end and tapered for nestability thereof when empty pallets are stacked with each other, said projecting members also having a height of a substantial portion of the overall height of the pallet and being arranged so as to define forklift passages between the projecting members of a substantially uniform overall height for receiving the arms of a forklift, said projecting members having flat bottom bearing surfaces for vertical load distribution and flat tapered side wall bearing surfaces for self aligning stackability, said flat tapered side walls having an overall height at least several times greater than their thickness and substantially the same as the forklift passages,* the projecting members and the platform members [of each pallet being so constructed and arranged] *of each foot means being symmetrically disposed with respect to the centerlines of the pallet such that said projecting members are in mirror image relation to the platform members of the corresponding foot means positioned on the opposite side of the centerlines, so* that the projecting members of each pallet abut the platform members of a pallet of an adjacent shipping container [and provide] *and the flat tapered side wall bearing surfaces thereof serving for providing* a lateral anti-shift interengagement between adjacent shipping containers, and wherein the projecting members and the platform members of each pallet are [also] *thus* so constructed and arranged that each shipping container of the stack may be reoriented in at least another position of orientation 180° out-of-phase from its previous stacked position relative to the other shipping containers, with the pallets of the reoriented shipping container still being in mating relation to the adjacent pallets and with the projecting members of each pallet of the reoriented shipping container abutting the platform members of the adjacent pallets, the respective projecting members of each diagonally opposed pair of said corner foot means of each [pallets] *pallet* having *said* side [engagement] *wall bearing* surfaces facing in opposite directions from each other for providing the lateral anti-shift interengagement between adjacent pallets when in stacked relationship, and further wherein said *height and said hollow construction and said symmetrical arrangement of said* projecting members of each pallet are [hollow and constructed so as to be nestably engaged with] *such that the* projecting members [of] *may be nestably engaged with* another substantially identical unloaded pallet facing in the same direction and in any of said positions of orientation, whereby a relatively large number of unloaded pallets may be nestably stacked so as to occupy considerably less space when being stored or shipped.

27. A stack of shipping containers according to claim 26 wherein said side [engagement] *wall bearing* surfaces of the projecting members of one of said pairs of diagonally opposed corner foot means of each pallet extend at a substantially right angle with respect to the side [engagement] *wall bearing* surfaces of the projecting [members] *members* of the other pair of diagonally opposed corner foot means of each pallet, and wherein the side [engagement] *wall bearing* surfaces of each diagonally opposed pair of corner foot means of each pallet extend substantially parallel to each other.

* * * * *